March 30, 1965 — H. JENSEN — 3,176,308
CONTINUOUS PHOTOGRAPHIC APPARATUS
Filed Sept. 19, 1960 — 4 Sheets-Sheet 1
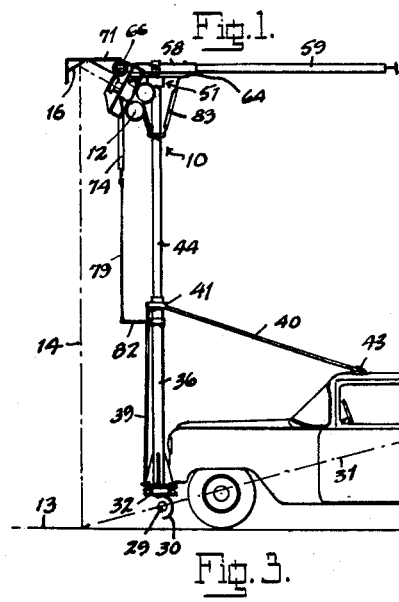
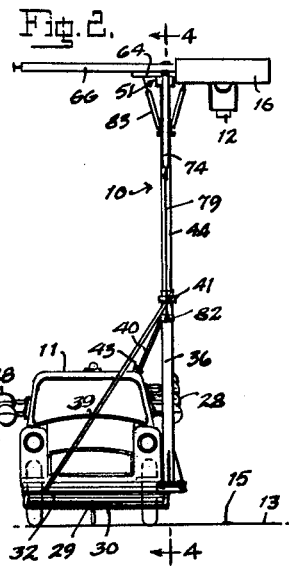
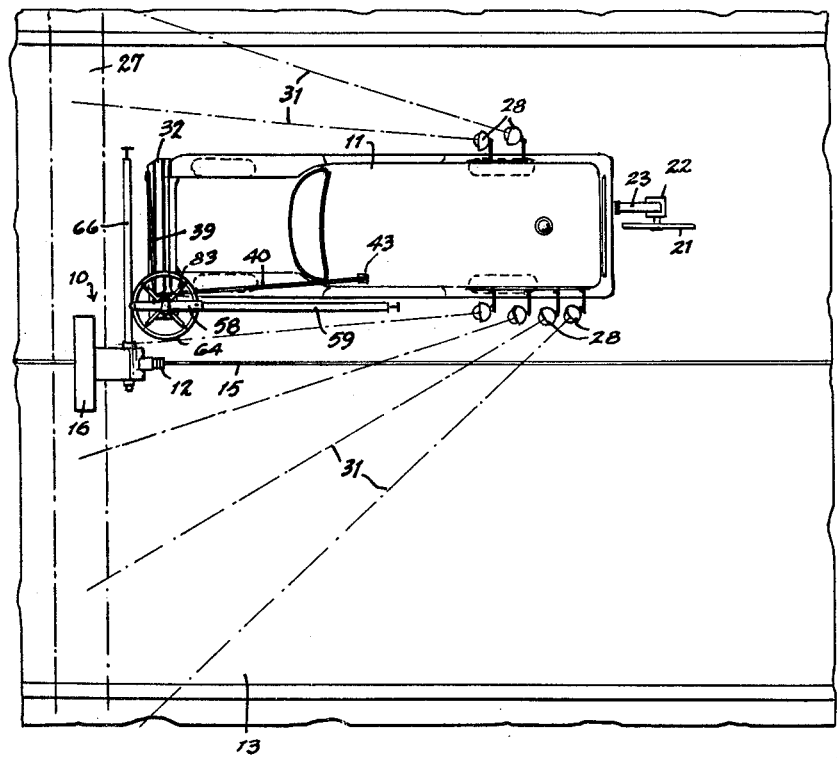
INVENTOR.
HOMER JENSEN
BY
ATTORNEY

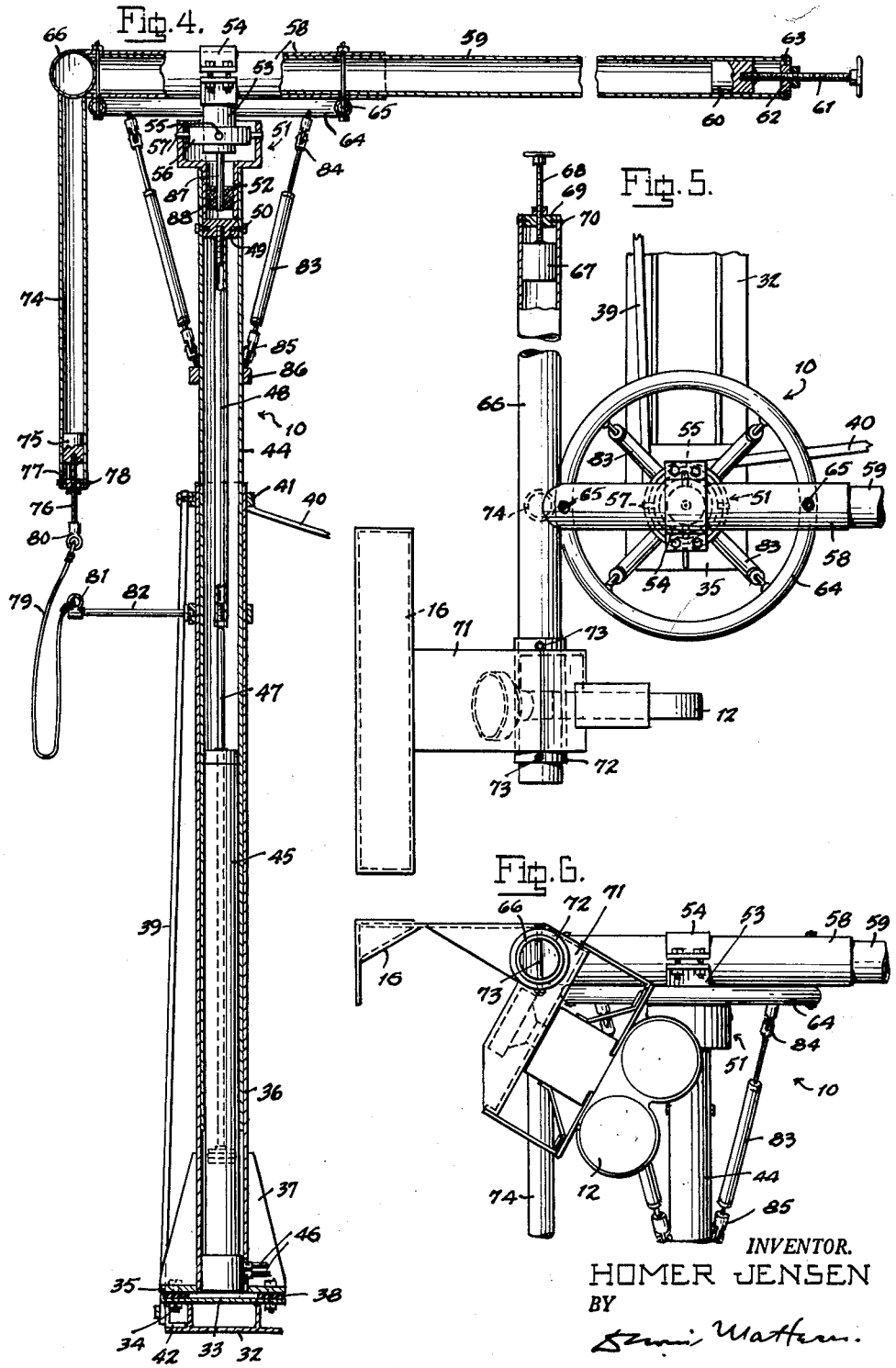

March 30, 1965 H. JENSEN 3,176,308
CONTINUOUS PHOTOGRAPHIC APPARATUS
Filed Sept. 19, 1960 4 Sheets-Sheet 3
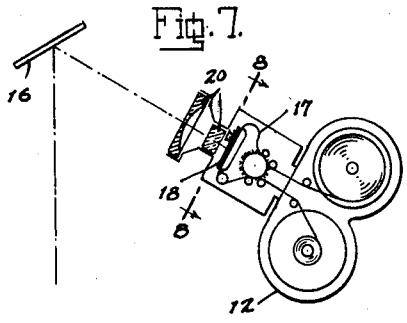
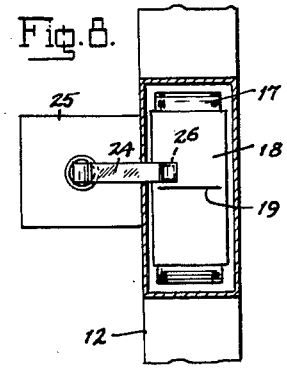
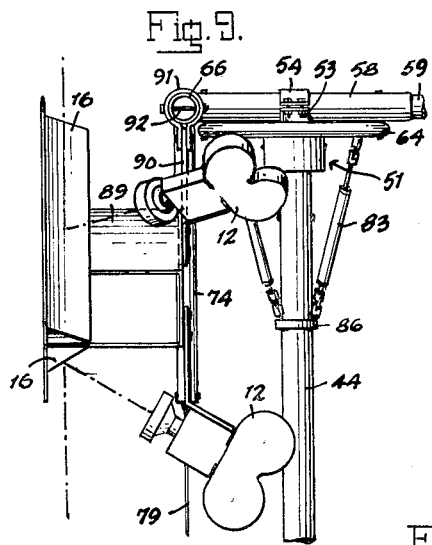
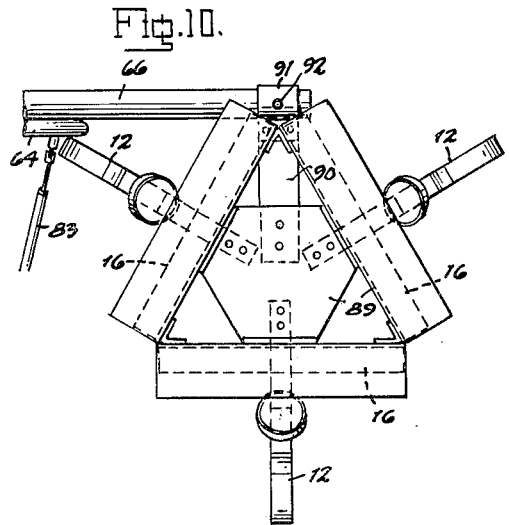
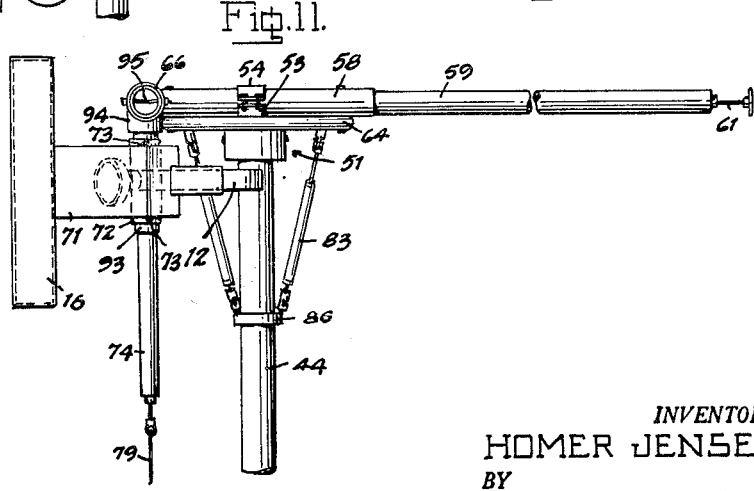
INVENTOR.
HOMER JENSEN
BY
ATTORNEY.

March 30, 1965   H. JENSEN   3,176,308
CONTINUOUS PHOTOGRAPHIC APPARATUS
Filed Sept. 19, 1960   4 Sheets-Sheet 4
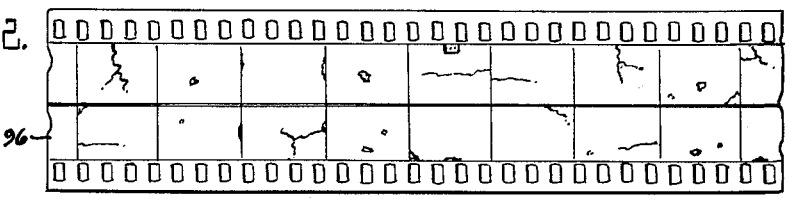
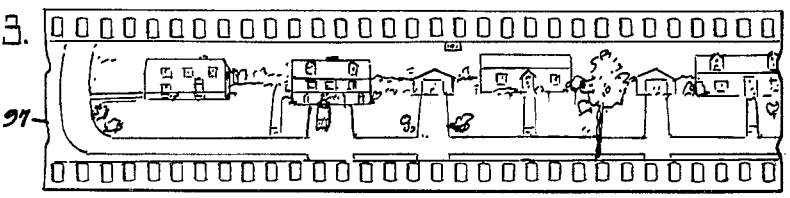
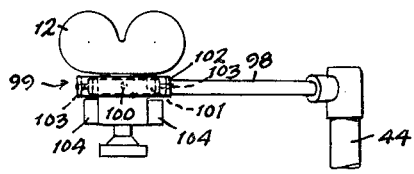
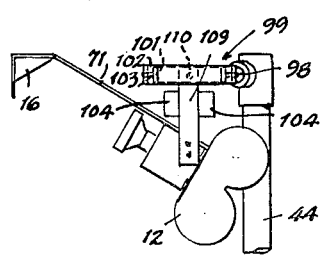
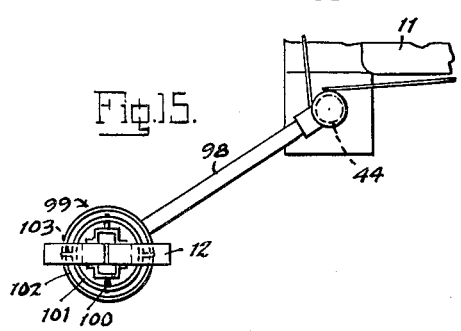
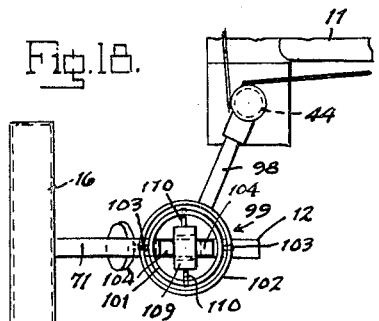
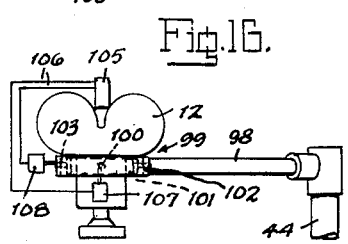
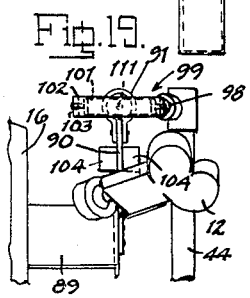
INVENTOR.
HOMER JENSEN
BY
ATTORNEY.

United States Patent Office 3,176,308
Patented Mar. 30, 1965

3,176,308
CONTINUOUS PHOTOGRAPHIC APPARATUS
Homer Jensen, Elkins Park, Pa., assignor to Aero Service Corporation, Philadelphia, Pa., a corporation of Pennsylvania
Filed Sept. 19, 1960, Ser. No. 56,862
2 Claims. (Cl. 346—107)

This invention relates to photographic apparatus for the continuous strip photographing of objects or surfaces generally linear in arrangement or dimensions by means of a strip camera mounted upon a vehicle movable along a fixed path generally parallel to the linear arrangement or dimensions of the objects or surfaces to be photographed. An object of the invention is to so relate the strip camera to the supporting vehicle and the object or surface being photographed that normal vibration and pitch and roll movements of the vehicle will be effectually isolated from the camera so that its optical axis will be constantly maintained perpendicular to the object or surface being photographed. To this end it is proposed to provide a stabilizing support for the camera which effectually filters out all low frequency vibrations and angular movements which might be transmitted from the vehicle.

In the operation of a strip camera the image is focused through a narrow slit upon film in the image plane, and the film is caused to move continuously at a speed and direction equal to that of the image as a result of the movement of the supporting vehicle relative to the photographed object or surface, and it is an object of the invention to provide effective means for synchronizing the speed of movement of the film with the speed at which the vehicle traverses in relation to the object or surface being photographed, irrespective of variations that may take place between the vehicle and its supporting surface, as, for instance in the case of a wheeled vehicle, wheel circumference variations due to different tire sizes or different degrees of tire inflation.

One important manifestation of the invention is in the photographing of the surface condition of highways. In this usage it is desired to obtain in a single strip a photographic record of the full width of the highway by the passage of the vehicle over a single lane of the highway at one side of a center strip, and to this end it is proposed to provide a stabilized support for the camera which disposes its optical axis directly over the center strip of the highway, and further to employ in the camera a suitable wide angle lens which will effectually cover the full width of the highway.

Because of normal daytime traffic conditions it is usually desirable to carry on such highway photography at night when there is little or no traffic, and an object of the invention is to provide effectual lighting means carried by the vehicle which illuminates the strip across the highway parallel to and in the optical path of the slit of the camera through which the image is focused. It is further proposed to provide the vehicle with high-power, low-incident lighting means to give maximum three-dimensional modeling of the surface or objects. In particular, it is proposed to beam a controlled amount of light at predetermined angles directed in a constant plane intersecting the optical path of the camera, whereby the shadow images of projections and depressions in the surface or objects being photographed may be qualitatively compared and evaluated by interpretive specialists with accuracy and precision not possible under ordinary field methods. Under such precisely controlled conditions, such things as incipient erosion faults and cracking are rendered instantly identifiable. Strip photographs of entire highway systems may be produced to provide a permanent pictorial record, and to present conveniently a graphic, undeniable proof of surface conditions to interested public officials and citizens.

A further object is to provide an apparatus which is compatible with the normal conditions encountered upon highways, as for instance bridges, tunnels, overhead wires, etc. and to this end it is proposed to provide an apparatus which has a normal maximum height which will permit it to clear such structures. A further object is to provide a stabilizing camera support which may be conveniently raised and lowered for garaging, servicing, or other requirements.

A further object is to provide an apparatus which lends itself to the stabilized support of the strip camera in various positions so that its optical axis may be directed vertically downward, vertically upward, or transversely, thus enabling the photographing of objects or surfaces above or at the sides of highways, such as overhead wires, tunnels, parked cars, houses, etc. It is a further object to provide an apparatus in which a plurality of stabilized strip cameras may be supported for the simultaneous photographing of objects or surfaces beneath, above, and at one or both sides of the supporting vehicle.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

FIG. 1 is a side elevation of the apparatus according to one embodiment of the invention, the same being shown in its relation to a highway;

FIG. 2 is a front elevation;

FIG. 3 is a top plan view;

FIG. 4 is a vertical sectional view on an enlarged scale and partially broken away, taken along the line 4—4 of FIG. 2, the extensible supporting post being shown in a retracted or lowered position as compared to the extended position shown in FIGS. 1–3;

FIG. 5 is a top plan view partially broken away of the stabilizing support for the camera;

FIG. 6 is a side elevation partially broken away of the stabilizing support for the camera;

FIG. 7 is a diagrammatic view showing the relation of the film to the slit aperture of the strip camera;

FIG. 8 is a front view as seen along the line 8—8 of FIG. 7 showing the slit aperture plate of the camera, and also showing diagrammatically the arrangement of an indicia recording attachment of the camera for the selective or periodic recording of identifying indicia upon the film;

FIG. 9 is a side elevation of a modified form of the apparatus, in which a plurality of cameras are provided to cover a 360° range for the simultaneous strip photography of the bottom, sides, and top surfaces of tunnels, subways, viaducts or the like;

FIG. 10 is a front elevation of the apparatus, as seen in FIG. 9;

FIG. 11 is a side elevation of a modified arrangement in which the optical axis of the camera is disposed horizontally for photographing houses or the like at the side of a highway;

FIG. 12 is a plan view of a short length of a typical vertical-view continuous photographic strip made in accordance with the invention, and showing a highway;

FIG. 13 is a plan view of a short length of a typical side-view continuous photographic strip made in accordance with the invention, and showing houses or the like at the side of a highway;

FIG. 14 is a side elevation showing a modified form of the apparatus wherein a vertically disposed camera is supported by a gimbal in pendular relation and is provided with rate-gyro stabilization;

FIG. 15 is a plan view of the apparatus of FIG. 14;

FIG. 16 is a side elevation of an apparatus similar to that shown in FIGS. 14 and 15 and provided with servo-gyro stabilization;

FIG. 17 is a side elevation of modified arrangement of gyro stabilized apparatus in which the camera axis is folded by means of an interposed mirror;

FIG. 18 is a plan view of the apparatus of FIG. 17; and

FIG. 19 is a side elevation of a gyro stabilized apparatus embodying the multiple camera arrangements of FIGS. 9 and 10.

Referring to the drawings, and in particular to FIGS. 1–3 illustrating one embodiment of the invention, the stabilized photographic apparatus, indicated generally as 10, is mounted at the forward left hand corner of a truck 11 with the strip camera 12 supported at a height of about 14 feet above the highway surface 13 with its optical axis, indicated by the broken line 14, perpendicular to the highway surface and in line with the center strip 15 dividing the highway into right and left lanes. While the camera may if desired be pointed directly downward, it is preferred to lower the clearance required by folding the optical path, the camera in this case being pointed upward and forward at an inclined mirror 16 which then directs the extension of the lens axis vertically downward to the center of the highway surface to be photographed.

The strip camera 12 is of well-known design and preferably employs 35 mm. motion picture film, 17, which as shown diagrammatically in FIG. 7 is moved continuously behind a plate 18 having an aperture in the form of a transverse slit 19 extending across the width of the film, the width of the slit being of the order of about .010 inch. The camera is provided with a lens system 20 including a wide angle lens, preferably having a coverage of about 120°, and which at a distance of 15 feet will span and extend beyond the normal width of a two-lane highway. Suitable precision driving means is provided in the camera to cause the film to be continuously moved at a speed and direction equal to that of the image as a result of the movement of the supporting vehicle relative to the photographed surface or object. Thus for example if a ⅜ inch focal length lens is being used at a distance of 15 feet or 180 inches, the ratio of image distance to object distance is 1:480; and the ratio of film speed to vehicle speed is as a consequence 1:480. Thus if the vehicle is moving at a speed of 40 feet or 480 inches per second, the film must move at the speed of one (1) inch per second.

While it is possible to manually and empirically adjust to vehicle speed so that the image will be properly formed it is proposed according to the invention to employ with direct linkage or servo-controlled mechanisms which are well-known in the art, so that the ratio of vehicle speed will be kept proper at all times, in spite of variations in the vehicle speed. While such linkage or mechanism may be actuated in the manner of a speedometer directly from the vehicle wheels, it is preferred that an auxiliary wheel of constant effective radius and convenient circumferential length be employed. By convenient circumference one may imagine either 10 feet or 1/500 of a mile, for their easily handled sub-multiples of the wheel turns may be employed as markers for identification of position. The auxiliary wheel 21 and a control mechanism 22 driven thereby may be hingedly connected by an arm 23 to the rear of the vehicle, the mounting being preferably spring loaded so as to maintain the wheel in constant contact with the highway surface.

Identifying indicia in the form of numbers or other suitable marks may be exposed upon the film, through conventional lens, shutter, mirror, and prism systems associated with the strip camera at positions on the film corresponding to the part of the surface or object being photographed at the instant of identification, such indicia recording means being either selectively controlled by the operator of the apparatus or being automatically operated at predetermined intervals corresponding to predetermined distances traversed. As shown in FIG. 8 such means includes a 180° Poro prism 24 having one inclined face in line with the lens system of the camera attachment, indicated generally as 25 and the opposite inclined face disposed over a rectangular aperture 26 in the plate 18 close to one end of the slit 19, so that the identifying indicia is exposed upon one edge portion of the film without appreciable interference with the highway or other image being photographed through the slit.

While the strip encompassed by the camera, for instance the illuminated band indicated by the dot-and-dash lines 27 in FIG. 3, may be lighted by any suitable lighting system or under ambient lighting conditions, an important feature of one aspect of the invention is the provision of high-power, low-incident lights carried by and specially arranged upon the vehicle. These may be powered by a multi-volt generator housed in the rear of the vehicle. As seen in FIGS. 1–3 electric reflector lamps 28 are provided in suitable arrangement along each side of the vehicle, and additionally an elongated lamp 29 and reflector 30 are provided forwardly of the vehicle, preferably beneath the forward bumper. The lamps 28 and the lamp 29 are so arranged and focused that their focal axes are beamed as indicated by the broken lines 31 across the band 27 at an angle transverse to the optical path 14 of the camera.

It is characteristic of strip camera photography that the photographs show normal perspective in the axis transverse to the direction of film movement, but that all measurements parallel to the film axis are isometric, and the point of view is constant. With the vehicle carried lighting system in the arrangement as shown in FIGS. 1–3 the result is that just as the point of view is constant in the strip photograph, the angle of lighting remains constant for all points along the length of the entire section of the film. In this manner the lighting is controlled so that it is identical in any one section of the photograph with all other sections, and thus qualitative comparisons can be made. As all of the lighting sources are in a single plane which includes the trace of the image of the camera slit, i.e., the part of the surface or object being photographed at a given instant, it can be seen that the shadow lengths in the direction of vehicle movement will be identical for all identical object heights in relation to the plane on which they rest. It is also evident that this component of shadow lengths will be proportional to the height of the object, and thus object heights can be measured from a knowledge of the shadow lengths in the long film direction and the angle from which the light has been cast. By extension, it may be seen that the depth of holes or the amount of drop from shear movement of one surface relative to another may be measured. Furthermore, qualitative differences may be seen in that objects which present their faces to the light source show as light lines in the photograph and objects which present their faces in the opposite direction show as dark lines.

While the system of the vehicle carried controlled lights is particularly valuable in the photographing of highways during the night when there is little or no traffic, it will of course be understood that under other conditions it is desirable to utilize other types of illumination. For example, the apparatus of the invention may be employed in a survey project to determine the existing pattern of artificial illumination on the highway, in which case the photograph would depend upon the existing highway illumination.

The stabilizing mount for the camera is as previously mentioned supported at the forward left hand end of the vehicle 11, both for the purpose of conveniently supporting the camera at a position directly over the central strip of a two-lane highway and to provide clear visibility for the driver of the vehicle. In order to compensate for the uneven weight imposed upon the vehicle the forward left hand springing and shock absorbing structures of the vehicle may be suitably bolstered.

A channel beam 32 is rigidly secured beneath the forward frame structure of the vehicle and projects beyond its left hand side where it supports a platform 33, preferably welded thereto, and upon which there is secured by bolts 34 the base plate 35 of a vertical cylindrical tubular post 36. Reinforcing webs 37 are welded between the post and the base plate 35 and suitable vibration absorbing insulated blocks 38 of rubber or the like are interposed between the plate 33 and base plate 35. Tie-rods 39 and 40 are connected at one end to a collar 41 fixed upon the upper end of the post and are connected respectively at their other ends to the right hand end portion of the channel beam 32 by a bracket 42 and to the top of the vehicle 11 by a bracket 43.

Telescopically engaged within the post 36 is a cylindrical tubular extension post 44 adapted for retraction and projection with respect to the post 36, the projected position being such as to support the camera at the desired operating height above the highway, and the retracted position making for more convenient garaging and servicing, as well as travel between work assignments. For the purpose of automatically raising and lowering the post a hydraulic cylinder 45 is secured within the lower portion of the post 36 and is controlled by hose connections 46 extending to suitable apparatus within the vehicle under the control of the driver. The piston rod 47 of the hydraulic cylinder is connected by a tubular connecting rod 48 to a head member 49 secured by screws 50 within the upper end portion of the extension post 44.

A gimbal unit 51 is secured upon the upper end of the post 44 by means of a tubular extension 52 of the unit fitted within the upper end of the post, a vertical stud 53 of a clamp 54 being pivotally mounted by pivot pins 55 within the ring 56 of the gimbal unit, and the ring in turn being pivotally supported by pins 57 having their axis at right angles to the axis of the pins 55.

The camera is supported upon a stabilizing structure consisting generally of a T-shaped assembly of rigid tubes which in turn are connected to the gimbal unit by the clamp 54, the stem of the T being normally horizontally disposed parallel to the travel direction of the vehicle and the cross of the T being horizontal and transverse of the travel direction. The T-shaped assembly comprises a horizontal tube 58 constituting the stem of the T within which there is engaged an extension tube 59, the latter being provided in its outer end portion with an adjustable weight mass 60 adapted to be longitudinally adjusted by means of an adjustment screw 61 secured thereto and having threaded engagement in a closure cap 62 fixed within the end of the tube by screws 63. The tube 58 is secured to the gimbal unit by the clamp 54, and at its underside in concentric relation to the stud 53 a horizontal ring member 64 is rigidly secured by bolts 64 and also preferably by welding. The cross piece of the T is formed by a tube 66 welded to the forward end of the tube 58, the camera 12 being supported upon its left hand end portion while its right hand end portion is provided with an adjustable weight mass 67 longitudinally adjustable by means of an adjustment screw 68 secured thereto and having threaded engagement in a closure cap 69 secured within the end of the tube by screws 70.

The camera is secured within a suitable frame 71 provided with a tube 72 slidably engaged upon the tube 66 and rigidly secured by bolts 73, the frame being such that the camera is supported beneath the tube with its optical axis inclined forwardly and upwardly in line with the inclined mirror 16 also mounted within the frame 71.

The T-shaped assembly and its adjustable weights provide a balanced mass supported upon the gimbal having a high moment of inertia, with the center of gravity of the balanced mass disposed a short distance below the centers of rotation of the gimbal unit. In this manner a small restoring couple makes for pendular stability. Control of the degree of pendularity is achieved by securing an additional tubular member 74 vertically downward from the cross point of the T-shaped assembly, and providing an adjustable weight mass 75 within its lower end portion, this weight mass having an adjusting screw 76 secured thereto which has threaded engagement in a closure cap 77 secured within the end of the tube by screws 78. Thus by vertically adjusting the weight mass 75 the degree of restoring couple may be varied.

So that the rest position of the gimbal mount assembly may achieve the best compromise in view of dynamic conditions of operations, an additional restoring coupling is provided by means of a spring or elastic cord 79 connected between an eye member 80 provided upon the lower end of the screw 76 and an eye member 81 provided upon a fixture 82 secured upon the vertical post 36. In this manner the movable assembly supporting the camera is caused to have a rest position such that the optical axis of the camera will be vertical and the combination of the pendular and spring restoring couples of the high moment of the structure makes for a low natural frequency.

To dampen the oscillations which will be transmitted to the movable structure, viscous dampening is provided by means of four pneumatic cylinder and plunger type dampening units 83 provided with controllable leak valves, and connected by universal joints 84 and 85 between the ring 64 and a collar 86 secured upon the tubular post 44. These dampening units are of well known type such for instance as employed for screen door stoppers. Further damping is achieved by vertical rod 87 depending centrally from the stud 53 and engaged within a cushioning mass in the form of a sponge rubber collar 88 disposed within the tubular extension 52 of the gimbal unit.

In FIGS. 9 and 10 there is shown a modification in which the apparatus is adapted for the simultaneous strip photography of the bottom, side and top surfaces of tunnels, subways, viaducts or the like, and to this end it is proposed to provide a multiplicity of synchronized cameras looking out on a 360° aspect in the sum of their coverage. In order to mount the multiplicity of cameras so that they will not obstruct each other's views, and so that the views of the respective cameras overlap to provide continuous pictures in the 360° aspect, it is proposed to provide a folded optical axis arrangement for each camera in a similar manner to the folded axis arrangement illustrated in FIGS. 1–7 wherein the camera is canted and photographs into a mirror. In this manner the origins of the several cameras will be so located that overlap will occur. In the illustrated embodiment three cameras are employed, each having a 120° wide angle lens and with the optical axes of the cameras disposed in planes forming an angle of 120° with each other. In the case of 180° lens being employed two cameras would be used, and in the case of a 90° lens four cameras would be used.

In the illustrated embodiment the three cameras 12 and their respective mirrors 16 are rigidly mounted upon a frame 89 provided with a suspension hanger 90 having a collar 91 at its upper end secured upon the tubular cross piece 66 of the stabilizing mount by means of a bolt 92. In operation three film strips are produced which together show the entire 360° aspect of the tunnel or the like being photographed.

In FIG. 11 there is shown a modified arrangement wherein the camera unit 12 and its mirror 16 are mounted upon the stabilizing mount so that the optical axis is horizontal, instead of vertical as in the arrangement shown in FIGS. 1–7. For this purpose a vertical post 93 is mounted upon the cross piece 66 of the stabilizing mount by means of a suitable T fitting 94 secured by a bolt 95. The mounting sleeve 72 of the frame 71 of the camera unit is secured upon the vertical post 93 similarly to its mounting upon the horizontal post 66 in FIGS. 1–7. In the illustrated embodiment the optical axis is directed horizontally to the right of the supporting vehicle. By inverting the unit upon the post 93 it may be directed to the left. Similarly, it is pointed out with respect to the arrangement shown in FIGS. 1–7 that whereas the optical axis is shown as directed vertically downward it may be directed vertically upward by inverting the camera assembly upon the cross piece 66 of the stabilizing mount.

In FIG. 12 there is shown a short length of a typical film strip 96 showing a highway surface as photographed by the camera arrangement illustrated in FIGS. 1–7, and in FIG. 13 there is shown a short length of a typical film strip 97 showing houses and the like at the side of a highway as photographed by the side-viewing arrangement of the apparatus in FIG. 11. The latter type of photographic record is especially valuable for tax inventory, census, zoning and similar purposes.

In FIGS. 14–19 modifications of the invention are shown in which stabilization of the camera unit is effected by gyroscopic means. As shown in FIGS. 14 and 15 a horizontal arm 98 is rigidly mounted upon the upper end of the extension post 44 and supports a gimbal unit 99 in which the camera 12 is pivotally mounted in pendular relation with its optical axis vertical disposed, the center of gravity of the camera unit being below the gimbal pivots 100 connecting the camera unit to the gimbal ring 101, which in turn is pivotally mounted in the fixed ring 102 of the gimbal unit by pivots 103. A pair of rate gyro units 104 are mounted upon the camera case below the gimbal and are arranged with their axes mutually perpendicular to each other and to the vertical reference axis of the assembly. The effect of the combination is to exert a resistance to rotation of the assembly axis, the camera remaining vertical because of its pendulous suspension and being restrained from rapid oscillation because of the resistance of the gyro assemblies. Thus there is provided a long period pendulum.

In FIG. 16 there is shown a gyro stabilization arrangement in which a vertical gyro unit 105 is mounted in the same gimbal as the camera and has servo-connections 106 with servo-motors 107 and 108 connected to the respective pivots 100 and 103 of the gimbal and which tilt the gimbal mounts to re-erect the gyro unit in case it begins to tilt. Since the gyro unit is rigidly connected to the camera erection of the gyro will thereby erect the camera, keeping it in a vertical position.

In FIGS. 17 and 18 a folded optical axis camera assembly comprising the camera 12 and mirror 16 is shown supported in a gyro stabilized gimbal mount. In this case a suspension hanger 109 secured to the camera case is pivoted at 110 in the gimbal ring 101 of the gimbal unit 99 and rate gyro units 104 are mounted upon the hanger in substantially similar arrangement to the modifications of FIGS. 14 and 15.

In FIG. 19 there is shown the manner in which the plurality of cameras as seen in FIGS. 9 and 10 may be gyro stabilized, the suspension hanger 90 being pivotally connected at 111 to the gimbal ring 101 of the gimbal unit 99 and rate gyros 104 being mounted upon the hanger 90. It is pointed out that while the rate gyro arrangement is shown in FIGS. 17–19 the servo gyro arrangement as shown in FIG. 16 may be employed.

What is claimed is:

1. In an apparatus for making a continuous photographic record of linearly arranged objects or surfaces lying substantially parallel to the travel path of a vehicle moving linearly upon a supporting land surface, a wheeled land vehicle adapted to have rolling contact with said supporting land surface, a photographic strip camera carried by said vehicle including lens means for focusing an image upon a film strip through a slit arranged transversely to the film strip and having its optical axis perpendicular to and intercepting a line across said objects or surfaces which is transverse to said travel path and represents the image of said objects or surfaces focused upon said film strip, means adapted to have rolling contact with said supporting land surface for synchronizing the operation of said camera with the travel speed of said vehicle whereby said film strip is moved at a speed and direction equal to that of the image as a result of the linear travel of said vehicle relative to said objects or surfaces, means for stabilizing said camera whereby its optical axis remains substantially constant with respect to said supporting land surface, and means carried by said vehicle for directing a beam of light to said objects or surfaces lying in the optical path of said camera in a common plane transverse to the optical axis and at a substantially grazing angle of incidence to the line of said objects or surfaces intercepted by the optical axis.

2. In an apparatus for making a continuous photographic record of linearly arranged objects or surfaces lying substantially parallel to the travel path of a vehicle moving linearly upon a supporting land surface, a wheeled land vehicle adapted to have rolling contact with said supporting land surface, a plurality of photographic strip cameras carried by said vehicle having their optical axes respectively directed to different linear aspects of said objects or surfaces, the angles of view of said cameras being such that they have a 360° aspect in the sum of their coverage, and each said camera including lens means for focusing an image upon a film strip through a slit arranged transversely to the film strip and having its optical axis perpendicular to and intercepting a line across said objects or surfaces which is transverse to said travel path and represents the image of said objects or surfaces focused upon said film strip, means mounted on said land vehicle and adapted to have rolling contact with said supporting land surface for synchronizing the operation of said cameras with the travel speed of said vehicle whereby each said film strip is moved at a speed and direction equal to that of the image as a result of the linear travel of said vehicle relative to said objects or surfaces, and means for stabilizing said cameras whereby their optical axes remain substantially constant with respect to said supporting land surface.

References Cited in the file of this patent

UNITED STATES PATENTS

| | | |
|---|---|---|
| 1,880,960 | Keale | Oct. 4, 1932 |
| 2,007,215 | Remey | July 9, 1935 |
| 2,012,628 | Howell | Aug. 27, 1935 |
| 2,160,006 | Thompson et al. | May 30, 1939 |
| 2,198,115 | John | Apr. 23, 1940 |
| 2,200,736 | Bedford et al. | May 14, 1940 |
| 2,446,096 | Moore | July 27, 1948 |
| 2,719,470 | Jensen | Oct. 4, 1955 |
| 2,943,546 | Gafford | July 5, 1960 |

FOREIGN PATENTS

| | | |
|---|---|---|
| 498,508 | Italy | Sept. 30, 1954 |
| 946,594 | Germany | Aug. 2, 1956 |